(12) United States Patent
Graziani et al.

(10) Patent No.: US 7,530,756 B2
(45) Date of Patent: May 12, 2009

(54) CONNECTION BETWEEN A ROD AND CROSSHEAD IN A RECIPROCATING COMPRESSOR

(75) Inventors: Franco Graziani, Florence (IT); Simone Pratesi, Florence (IT)

(73) Assignee: Nuovo Pignone Holding S.p.a., Florence (IT)

( * ) Notice: Subject to any disclaimer, the term of this patent is extended or adjusted under 35 U.S.C. 154(b) by 1037 days.

(21) Appl. No.: 10/210,065

(22) Filed: Aug. 2, 2002

(65) Prior Publication Data

US 2003/0031504 A1 Feb. 13, 2003

(30) Foreign Application Priority Data

Aug. 9, 2001 (IT) .......................... MI2001A1757

(51) Int. Cl.
*F16C 5/00* (2006.01)

(52) U.S. Cl. .............................. 403/1; 403/320; 92/140; 123/66; 123/71 R

(58) Field of Classification Search ..................... 403/1, 403/320; 411/122, 123, 124, 402, 403, 427, 411/166, 432; 123/66, 71 R; 92/140; 74/44

See application file for complete search history.

(56) References Cited

U.S. PATENT DOCUMENTS

| | | | | |
|---|---|---|---|---|
| 1,371,134 A | * | 3/1921 | West | 411/123 |
| 4,044,618 A | * | 8/1977 | Braun | 74/29 |
| 4,872,395 A | * | 10/1989 | Bennitt et al. | |
| 5,031,512 A | * | 7/1991 | Graziani | |
| 5,052,275 A | * | 10/1991 | Mayer | 74/471 R |
| 5,509,382 A | * | 4/1996 | Noland | 123/71 R |
| 7,007,563 B2 | * | 3/2006 | Spiegl et al. | 324/207.24 |
| 2002/0074994 A1 | * | 6/2002 | Blubaugh et al. | 324/207.13 |

* cited by examiner

*Primary Examiner*—Daniel P Stodola
*Assistant Examiner*—Ernesto Garcia
(74) *Attorney, Agent, or Firm*—Nixon & Vanderhye P.C.

(57) ABSTRACT

A connection between a rod and crosshead in a reciprocating compressor includes threaded units, an anti-rotational securing device and axial positioning elements, wherein the threaded units has a first inner lock nut, provided with an inner thread onto which there is screwed a threaded end portion of the rod and provided with two outer threads with a different diameter, one of which is for connection to the left-handed anti-rotational securing device, and the units also include a second outer lock nut in the inner diameter of which a thread is provided.

9 Claims, 4 Drawing Sheets

CONNECTION BETWEEN A ROD AND CROSSHEAD IN A RECIPROCATING COMPRESSOR

BACKGROUND AND SUMMARY OF THE INVENTION

The present invention relates to means for connection between a rod and crosshead in a reciprocating compressor.

Priority is claimed to Italian patent application MI 2001/A00/1757, filed Aug. 9, 2001.

The most common type of reciprocating compressors consist of one or a plurality of cylinders inside which pistons provided with reciprocating motion slide.

As far as the kinematic control mechanism for the reciprocating motion of the piston is concerned, reference is made by way of example to the kinematic mechanisms which consist of a connecting rod and crank or a connecting rod, crank and crosshead.

The second type of transfer of reciprocating motion proposed is applied to machines which do not have a direct connection between the foot of the connecting rod and the piston, but require interposition of a stem or rod.

However, the rod is not designed to withstand transverse forces and it is therefore necessary to provide at its articulation with the foot of the piston a straight guide which forces the center of the articulation to move along the axis of the cylinder, constituted by the so-called crosshead.

The crosshead consists of a body provided with a journal or pin for articulation with the connecting rod, and with runners, wherein the axis of the pin is at right-angles to the axis of the rod and of the runners, i.e. it is disposed in the shape of a cross relative to the latter.

In general the runners are produced with a cylindrical surface made of cast iron or steel or light alloy, are integral with the body or added onto the latter and are covered with anti-friction metal. The runners slide in guides with a complementary cylindrical surface.

In general the body is produced from cast iron, cast steel or forged steel.

Hereinafter for the crosshead reference will be made by way of example to the configuration with a pin and two runners, which is designed for connection to drive shafts which can rotate in both directions, thus exchanging transverse forces with both the guides.

At present the means for connection between the piston rod and the crosshead in a reciprocating compressor consist of common threaded units, i.e. they consist of a nut and a single lock nut.

For correct fitting use is also made of elements to stop rotation, of the key type.

In the fitting solutions generally used the means for connection between the rod and the crosshead, i.e. the nut and lock nut, abut supports, for example flanges, which are finally connected to the crosshead by means of tie rods.

The tightening of the threaded units, such as to apply a predetermined load which assures the hold of these means for connection in use can be carried out manually for example, in the case of reciprocating compressors with low performance, or hydraulically.

The hydraulic tightening in the case of high-performance machines which must guarantee maximum reliability and safety makes it possible to obtain better preloading and thus better hold of the connection between the rod and the crosshead.

The hydraulic tightening of the means for connection between the rod and crosshead in reciprocating compressors is carried out for example by positioning the hydraulic jack on the rod, in the section between the nut and the lock nut, such as to abut between the nut and the support, which in turn is secured to the crosshead.

This solution is structurally more complicated, since corresponding holding means must be provided for the correct functioning of the hydraulic jack.

The main disadvantage of the means for connection between the rod and crosshead in a reciprocating compressor such as those used at present relates to limitation of the load applicable to the rod during functioning. On the basis of the foregoing information this value is dependent on the nominal value of the preloading applied during fitting and above all on the extent of the relaxation once the tightening has been completed, which is expressed in the form of a relaxation coefficient.

In fact, in the present fitting solutions, in a reciprocating compressor the means for connection between the rod and the crosshead, i.e. the nut or lock nut, are not subjected to stress during the fitting step but only at the moment of release of the traction load applied in order to connect the rod to the crosshead. The coefficient of relaxation is therefore not optimized with these fitting solutions.

In reciprocating compressors the means for connection between the rod and crosshead constitute a critical characteristic for the reliability and performance of the machine.

The dynamic stresses induced by the cyclical load, which is characteristic of the functioning of reciprocating compressors, can limit the performance of these means for connection above all from the point of view of fatigue strength, which is characteristic of the reciprocating motion functioning system.

The means for connection between the rod and crosshead of a reciprocating compressor used hitherto do not however constitute an optimized response in terms of performance of the machine.

A means is disclosed for connection between the rod and crosshead in a reciprocating compressor which eliminate the above-described disadvantages.

A means is disclosed for connection between the rod and crosshead in a reciprocating compressor which make it possible to obtain higher performance levels in terms of loads which can be applied to the rod for the same nominal preloading and type of thread of the nuts.

A means is disclosed for connection between the rod and crosshead in a reciprocating compressor which are particularly simple and functional, with low costs.

SUMMARY OF DRAWINGS

The characteristics and advantages of means for connection between the rod and crosshead in a reciprocating compressor according to the present invention will become more apparent from the following description, provided by way of non-limiting example with reference to the attached schematic drawings, in which.

DETAILED DESCRIPTION OF DRAWINGS

The figures show means for connection between the rod 12 and crosshead 13, in a reciprocating compressor 100, consisting substantially of threaded units, such as two lock nuts, an anti-rotational securing device and axial positioning elements.

Figure 1:
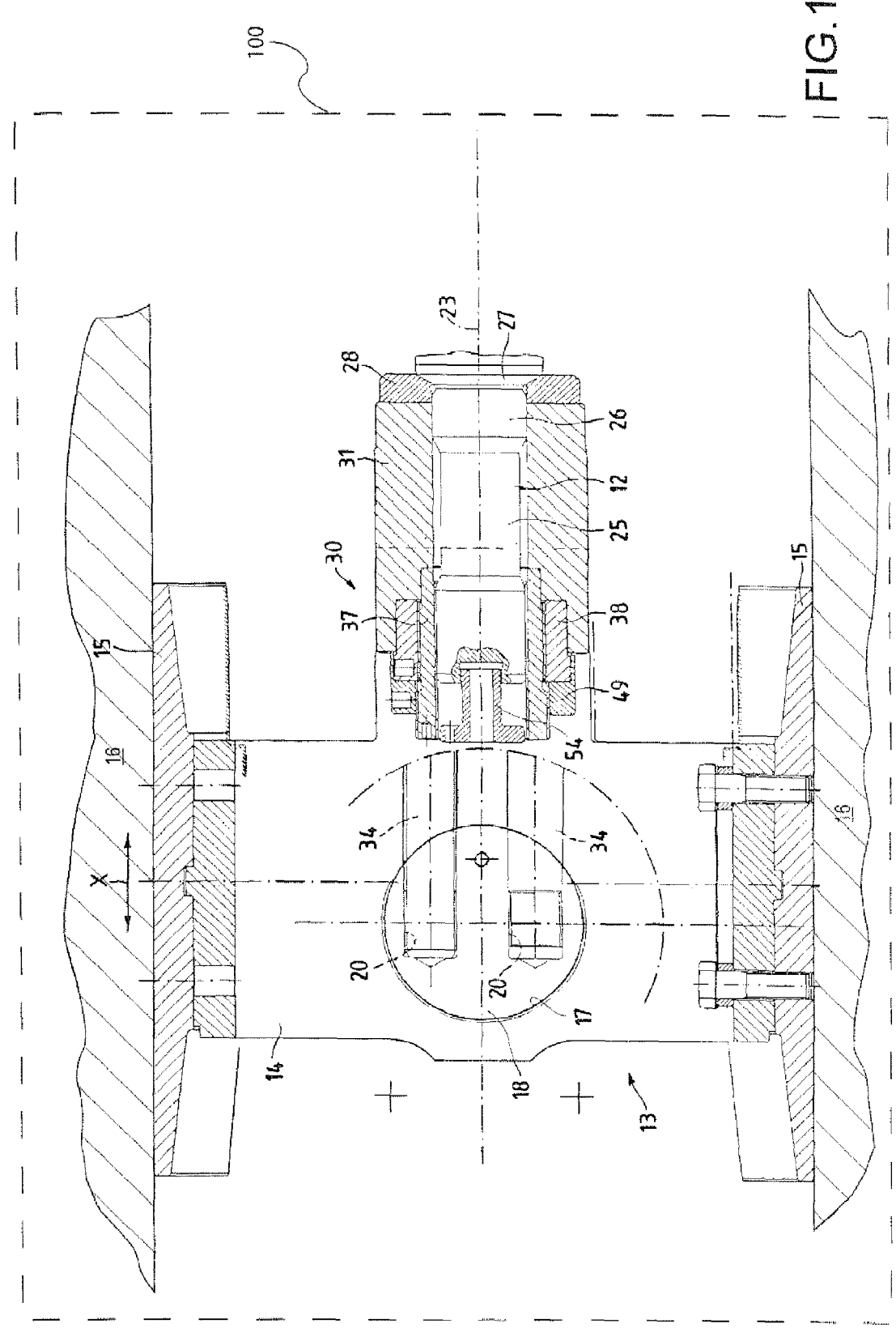
FIG. 1 is a lateral elevated view partially in cross-section of a crosshead of a reciprocating compressor on which a rod is fitted by means for connection, which are the subject of the present invention.
Figure 2:
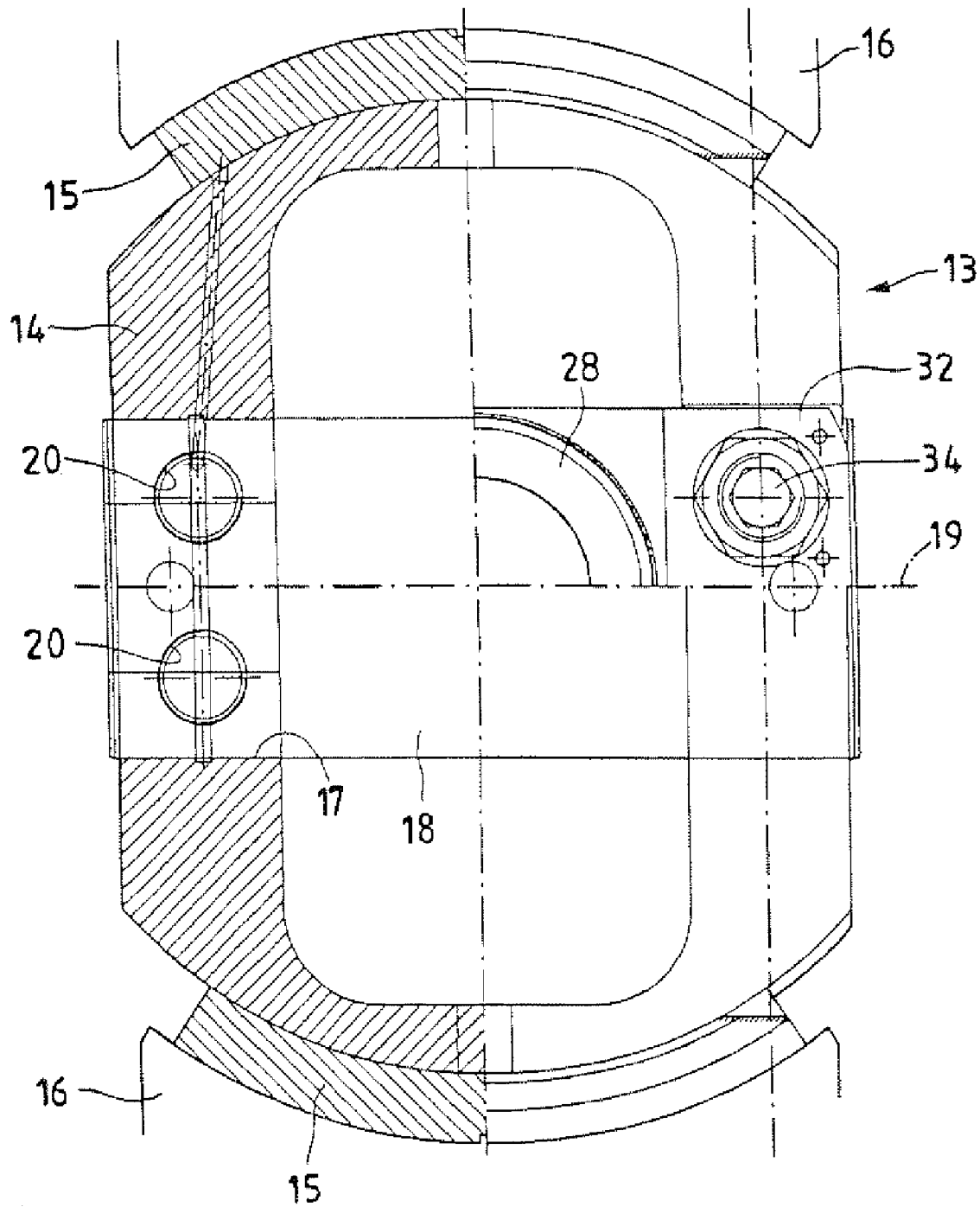
FIG. 2 is a lateral view of FIG. 1, which shows a crosshead bearing a rod and means for connection, which are the subject of the present invention, partially in cross-section on different planes.
Figure 3:
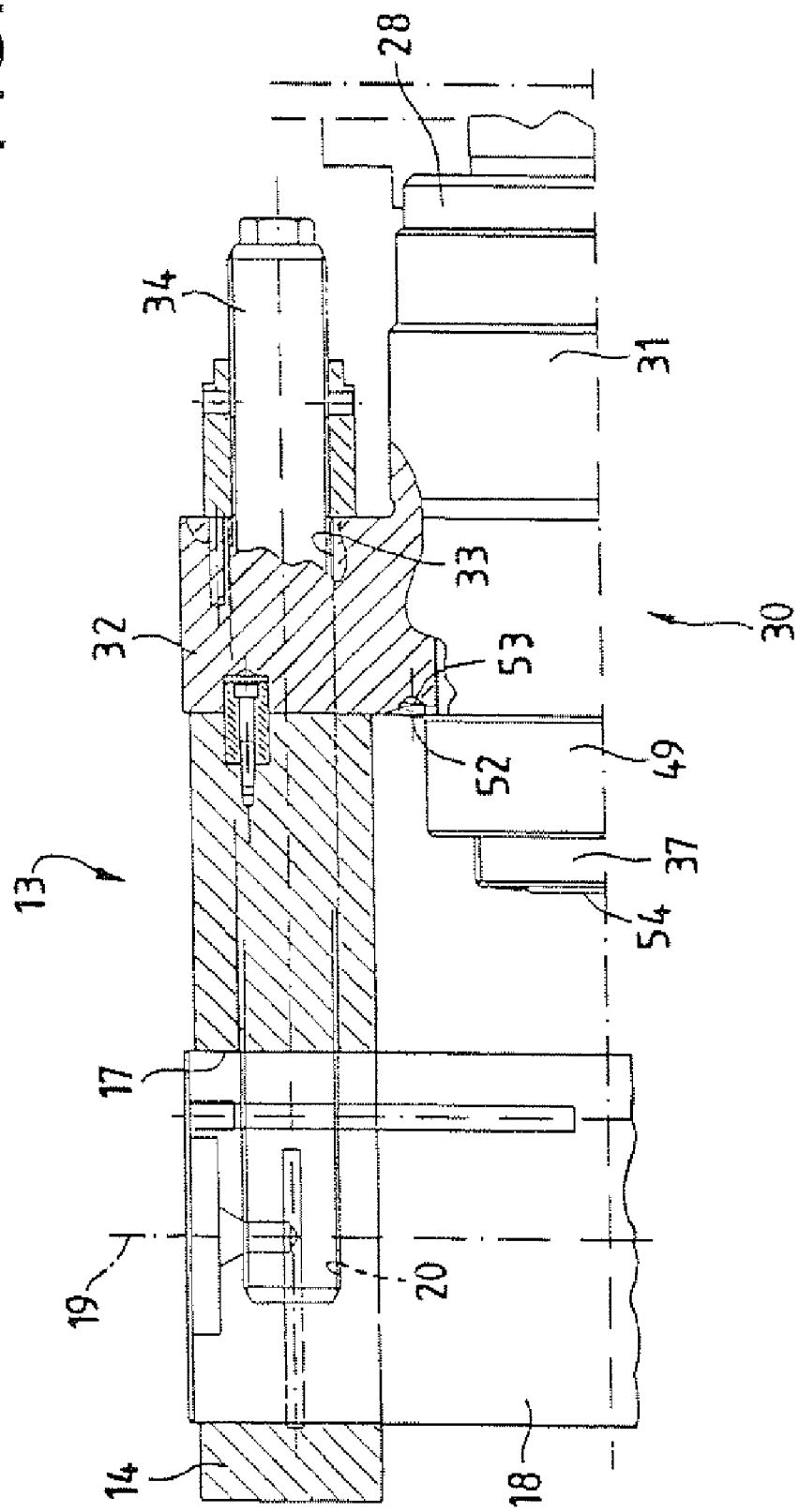
FIG. 3 is a plan view partially in cross-section of FIG. 1.

The crosshead 13 shown in FIGS. 1 to 3 consists of a body 14 and runners 15 with a cylindrical surface which slide in complementary guides 16. As shown in FIG. 2 the body of the crosshead 14 has a substantially hollow annular shape and is provided with a seat 17 to accommodate a pin 18, disposed with its axis 19 at right-angles to the direction of sliding X of the runners 15.

The pin 18, which is provided with countersunk threaded holes 20, constitutes the point of articulation with the connecting rod, not shown in the figures.

Figure 4:
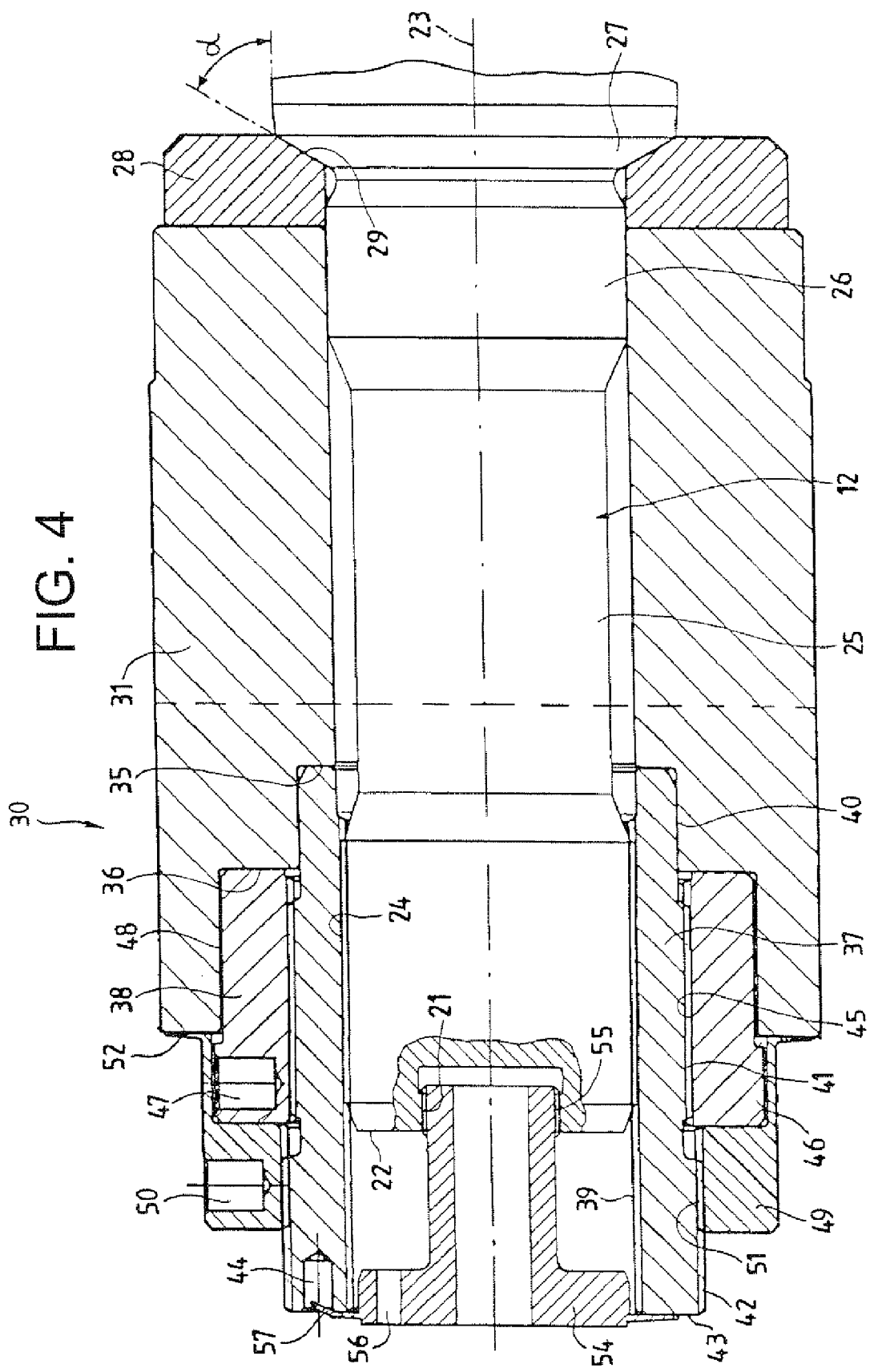
FIG. 4 shows an enlarged detail of the means for connection between the rod and crosshead in a reciprocating compressor, which is the subject of the present invention.

In the section in which it engages with the crosshead 13 the rod 12 has a countersunk threaded hole 21, which is provided in a circular head surface 22 along an axis 23 of the rod, as shown in detail in FIG. 4.

The rod 12 has a threaded end portion 24, a tapered section 25, a centering portion with a larger diameter 26 and finally, correspondingly connected to the latter, a stop surface 27 which is inclined by an angle α relative to the axis 23 of the rod.

A conical ring 28 forms part of the axial positioning elements of the assembly constituted by the rod 12 and piston relative to the fixed parts of the cylinder.

The positioning ring 28 has a frusto-conical mouth 29 which is complementary to the inclined stop surface 27 of the rod.

A flange 30 constitutes a further axial positioning element and consists of a sleeve 31 to contain the rod and lock nuts, which extends from a connection plate 32, provided with four holes 33 disposed in pairs on opposite sides.

In the holes 33 there are engaged an equivalent number of tie rods 34, which are screwed onto the pin 18 accommodated in the body of the crosshead 14, in order to connect the flange 30 to the crosshead 13.

The portion with a sleeve 31 of the flange 30 has an inner diameter which is equal to the maximum diameter of the centering portion 26 of the rod 12.

At one end of the flange 30, on the inner diameter, there are provided cylindrical seats 35, 36 against which there abut respectively a first inner lock nut 37 and a second outer lock nut 38.

The first inner lock nut 37 consists of a cylindrical element with an elongate shape, provided with an inner thread 39 which extends along its entire length. Externally there are present three separate sections with an increasing diameter. A first cylindrical section with a smaller diameter 40 is followed by a first outer thread 41 with a larger diameter and finally a left-handed outer thread 42 with a maximum diameter.

A lateral annular surface 43 of the first lock nut 37 is also provided with one or more holes 44 which co-operate with the anti-rotational securing element for the rod.

On the inner surface of the second outer lock nut 38 there is present a thread 45, and on the other hand the outer surface has at one end a cylindrical section 46, in which there is provided a hole 47 for the intervention of the tightening means and a cylindrical section with a smaller diameter 48.

The anti-rotational securing device consists of a ring nut 49 to secure the lock nuts 37 and 38, which is provided with a hole 50 for the intervention of the tightening means, and in the inner diameter of which there is provided a left-handed thread 51. The ring nut 49 is provided with a thin end lip 52, which, when the rod 12 is fitted, is positioned in the vicinity of a seat 53 provided in the flange 30, as shown in a detail in cross-section in FIG. 3.

The anti-rotational securing device also comprises an element 54 to secure the rod which has a cylindrical end portion provided with a left-handed thread 55, a hole 56 for the intervention of the tightening means and an outer limb 57. This outer limb 57 is provided in the form of a circular ring consisting of a thinned wall, or alternatively it can be produced for example in the form of tabs disposed annularly.

The anti-rotational securing device must assure a stable connection in conditions of use, by preventing the connected elements from becoming unscrewed from one another.

The means for connection of a piston between the rod 12 and the crosshead 13, which is the subject of the present invention, assure above all stable connection of the rod 12 to the flange 30, by means of the use of the double lock nut 37 and 38. These means thus assure connection of the flange 30 which is integral with the rod 12, to the body of the crosshead 14.

Since the rod is connected to the piston, which is already fitted inside the cylinder, the conical positioning ring 28 is inserted on the free ends of the rod 12 until it abuts the corresponding inclined surface 27, as can be seen from the enlarged detail in FIG. 4.

The conical ring 28, which is worked to the exact size during the initial fitting, serves the purpose of carrying out correct axial positioning in relation to the fixed parts of the cylinder of the unit constituted by the rod 12 and piston.

The flange 30 is thus inserted on the rod 12 until it abuts the conical ring 28, and also co-operates in carrying out the centering on the diameter of the rod.

The second outer lock nut 38 is screwed entirely onto the outer thread 41 with a smaller diameter of the first inner lock nut 37. The inner thread 39 of this first lock nut 37 then engages with that of the end portion 24 of the rod 12.

In this step the cylindrical sections with a smaller diameter 40 and 48 of the lock nuts 37 and 38 are inserted at least partially in the respective cylindrical seats 35 and 36 in the flange 30. In this condition only the first inner lock nut 37 abuts the flange 30. On the other hand the second outer lock nut 38 will be made to abut the flange 30, within its circular seat 36, in the successive fitting steps.

In order to tighten the means for connection between the rod 12 and the crosshead 13, the hydraulic jack is screwed onto the free section of the inner thread 39 of the first lock nut 37.

Pumping the oil to the required pressure provides the correct pre-tensioning of the end 24 of the rod 12 and deformation of the threads 39 of the first lock nut 37 engaged on the rod.

Whilst keeping the oil pressure constant, the tightening of the second outer lock nut 38 is completed until the lock nut abuts the seat 36 provided in the flange 30.

When the pressure is released in order to remove the hydraulic jack from the lock nut 37 there is reduced relaxation of the nominal preloading owing to the opposing thrust action exerted by the second lock nut 38.

The extent of relaxation of the preloading is commonly expressed in the form of coefficient of relaxation.

Finally, the application of the elements which constitute the anti-rotational securing device guarantees the maximum reliability in conditions of use, thus preventing loosening of the connection between the lock nuts.

The securing ring nut 49 is screwed fully onto the outer left-handed thread 42 of the first lock nut 37. On completion of the operation the end lip 52 is folded inside the corresponding seat 53 provided in the flange 30, as shown in FIG. 3, such as to prevent relative rotation between the ring nut 49 and the lock nut 37 and thus to prevent the latter from becoming unscrewed or loosened in use.

The securing ring nut 49 thus carries out the function of preventing possible loosening of the second lock nut 38 and thus also of the inner lock nut 37 which is integral with the latter, therefore rendering the lock nuts integral with the flange 30.

Finally, the securing element for the rod 54 prevents relative rotation between the rod 12 and the lock nut unit 37 and 38 unit relative to the flange 30, as previously described.

The securing element for the rod 54 is screwed onto the left-handed thread of the countersunk hole 21 provided in the circular head surface 22 of the rod 12 itself.

The outer limb 57 with a small thickness is thus folded into at least one hole 44 present in the lateral annular surface 43 of the first lock nut 37.

As prescribed by the standards API618, the anti-rotational securing between the rod 12 and flange 30, and consequently between the rod 12 and the crosshead body 14, is produced without using devices which are engaged in the highly preloaded section of the rod, such as centering keys. Since the rod is fatigue stressed, in fact the anti-rotational securing devices used hitherto jeopardize the intactness of the latter.

The flange 30 is connected to the body of the crosshead 14 by means of fitting operations which are known to persons skilled in the art, and are therefore listed only briefly.

The flange 30 is connected to the body of the crosshead 14 by means of four tie rods 34, which are screwed into the countersunk holes 20 in the pin 18 for articulation of the foot of the connecting rod, which pin is inserted in the seat 17 provided in the body of the crosshead 14.

The four tie rods 34 are tightened by means of hydraulic jacks, simultaneously for each opposite pair of tie rods in the cross.

The connection according to the present invention is also used for crossheads other than the type previously described.

In use a plurality of devices therefore contribute towards assuring the hold of the threaded connections between the rod and the flange. As well as having anti-rotational securing elements which are provided with a left-handed thread, these securing elements are also provided with thin limbs, which are folded inside holes in adjacent elements.

The means for connection between the rod and crosshead of a reciprocating compressor, which is the subject of the present invention, have the advantage of minimizing the decrease in preloading owing to the resilience of the parts concerned.

By use of the means for connection which are the subject of the present invention, the common relaxation values, which in general are equal to 40-50% of the nominal preloading, are reduced to relaxation of 20-25% of the nominal load.

The use of the means for connection between the rod and crosshead of reciprocating compressors, which is the subject of the present invention, thus makes it possible to obtain higher performance levels in terms of loads which can be applied to the rod for the same nominal preloading and type of thread of the nuts.

During the fitting step the hydraulic jack advantageously acts on the inner thread of the inner lock nut, the threads of which are immediately deformed by the action exerted on them, and continue to be deformed even after the tightening pressure has been released, owing to the action of the second lock nut.

In addition, the anti-rotational securing element of the rod, which assures the hold of the connection between the rod and flange, and consequently between the rod and the body of the crosshead, as required by the standards API618 fourth edition, has considerable advantages from the point of view of mechanical strength.

In fact, elimination of the common anti-rotational securing devices, for example of the key type, which engage in a highly preloaded section of the rod, makes it possible to increase advantageously the fatigue strength of the rod.

Numerous modifications and variations, all of which come within the scope of the invention, can be applied to the means for connection thus designed, between the rod and crosshead of a reciprocating compressor, which is the subject of the present invention; furthermore all the details can be replaced by technically equivalent elements. In practice any materials and dimensions can be used, according to the technical requirements.

What is claimed is:

1. A connection between a rod and a crosshead in a reciprocating compressor comprising:
   threaded units,
   an anti-rotational securing device and
   axial positioning elements connecting the crosshead and the rod, wherein the threaded units include a first inner lock nut and a second outer lock nut, the second outer lock nut further includes a threaded inner diameter to receive the first inner lock nut, wherein the first inner lock nut includes an inner thread onto which there is screwed a threaded end portion of the rod and the first inner lock nut includes outer threads with different diameters, wherein one of the outer threads threadably connects to the anti-rotational securing device, the other one of the threads threadably connects to the second inner lock nut which is inserted into one of the positioning elements.

2. A connection as in claim 1, wherein said anti-rotational securing device comprises a securing ring nut for the lock nuts, wherein an inner diameter of the securing ring nut includes a left-handed thread to receive a left-hand thread of the one of the outer threads of the first inner lock nut; the connection further includes an element to secure the rod includes a cylindrical end portion provided with a left-handed thread for engagement with a countersunk threaded hole, wherein the hole is provided in a circular head surface of the said rod.

3. A connection as in claim 2, wherein said securing ring nut includes an end lip foldable inside a seat provided in one of said axial positioning elements.

4. A connection as in claim 2, wherein said element for securing the rod includes an outer limb foldable into at least one aperture in a lateral annular surface of the first lock nut.

5. A connection as in claim 1, wherein said axial positioning elements comprise a positioning ring for connection to said rod and a flange for connection to the crosshead.

6. A connection as in claim 5, wherein said flange comprises a sleeve to contain the rod, the lock nuts, and a plate for connection to the crosshead.

7. A connection as in claim 5, wherein said positioning ring has a frusto-conical mouth surface which is complementary to a stop surface of the rod, and the mouth surface is inclined by an angle ($\alpha$) relative to an axis of the rod.

8. A connection as in claim 6, wherein said positioning ring has an inner diameter equal to a maximum diameter of a centering portion of the rod.

9. A connection as in claim 5, wherein said first inner lock nut and the second outer lock nut each have an end cylindrical section having a diameter for engagement in cylindrical seats provided in the inner diameter of the flange.

* * * * *